US009321474B2

(12) United States Patent
Olivier et al.

(10) Patent No.: US 9,321,474 B2
(45) Date of Patent: Apr. 26, 2016

(54) TRANSPORTATION OF VALUABLES (75) Inventors: Johan Olivier, Centurion (ZA); Johan Lehmann, Pretoria (ZA); Servaas Holtzhausen, Oxfordshire (GB); Peter Bosscha, Pretoria (ZA)

(73) Assignee: CSIR, Pretoria, Gauteng (SA)

( * ) Notice: Subject to any disclaimer, the term of this patent is extended or adjusted under 35 U.S.C. 154(b) by 299 days.

(21) Appl. No.: 13/992,024

(22) PCT Filed: Dec. 7, 2011

(86) PCT No.: PCT/IB2011/055502
§ 371 (c)(1),
(2), (4) Date: Jun. 6, 2013

(87) PCT Pub. No.: WO2012/077059
PCT Pub. Date: Jun. 14, 2012

(65) Prior Publication Data
US 2013/0249681 A1 Sep. 26, 2013

(30) Foreign Application Priority Data

Dec. 7, 2010 (ZA) .................................. 2010/08800

(51) Int. Cl.
*B62B 5/04* (2006.01)
*A45C 1/00* (2006.01)
(Continued)

(52) U.S. Cl.
CPC ................. *B62B 5/0404* (2013.01); *A45C 1/00* (2013.01); *A45C 5/14* (2013.01); *A45C 13/18* (2013.01); *G08B 15/02* (2013.01); *A45C 5/143* (2013.01); *A45C 13/24* (2013.01); *A45C 2001/003* (2013.01); *A45C 2003/002* (2013.01); *A45C 2005/148* (2013.01); *B62B 3/1404* (2013.01); *B62B 5/0006* (2013.01);
(Continued)

(58) Field of Classification Search
None
See application file for complete search history.

(56) References Cited

U.S. PATENT DOCUMENTS 4,881,389 A * 11/1989 Alfon et al. ...................... 70/209
4,925,204 A * 5/1990 Lugo ............................. 280/295
(Continued)

FOREIGN PATENT DOCUMENTS

| DE | 2139612 A1 | 2/1973 |
| JP | 2003328599 | * 11/2003 |
| JP | 2003328599 A | * 11/2003 |

OTHER PUBLICATIONS

International Search Report prepared by the European Patent Office on Feb. 5, 2013, for International Application No. PCT/IB2011/055502.

*Primary Examiner* — Fekadeselassie Girma
*Assistant Examiner* — Chico A Foxx
(74) *Attorney, Agent, or Firm* — Sheridan Ross P.C.

(57) ABSTRACT

The invention provides a theft-inhibiting carrier which includes a body 12 having a chassis 16 on which three wheels 18, 20 and 22 are mounted. The carrier 10 includes theft deterrent means 12. The theft deterrent means is configured, when activated, to dismount the wheels 20, 22 from their respective axles 44 but to retain them connected to the chassis 16 by an elongate flexible tether to impede the movement of the carrier. Two containers 60, 62 are provided and contain chemicals which are fed via pistons 68 to a mixing device 76 and into a valuables receiving chamber in which they foam and set thereby encasing valuables contained therein. A pair of arms 88 are pivotally displaced from a retracted position to an extended position in which they protrude from the containers 60, 62. Sharpened teeth 94 are provided on the arms to further inhibit displacement of the carrier.

16 Claims, 8 Drawing Sheets (51) Int. Cl.
*A45C 5/14* (2006.01)
*A45C 13/18* (2006.01)
*G08B 15/02* (2006.01)
*A45C 13/24* (2006.01)
*A45C 3/00* (2006.01)
*B62B 3/14* (2006.01)
*B62B 5/00* (2006.01)
*E05G 1/00* (2006.01)
*G08B 15/00* (2006.01)

(52) U.S. Cl.
CPC ...... *B62B 2202/00* (2013.01); *B62B 2205/104* (2013.01); *E05G 1/005* (2013.01); *G08B 15/00* (2013.01); *Y10T 29/49815* (2015.01); *Y10T 29/49821* (2015.01)

(56) References Cited

U.S. PATENT DOCUMENTS

| | | | | |
|---|---|---|---|---|
| 5,125,675 | A | * | 6/1992 | Engelbrecht .................... 280/37 |
| 5,952,920 | A | * | 9/1999 | Braddick .................. 340/568.1 |
| 6,892,653 | B1 | * | 5/2005 | Botha et al. ...................... 109/29 |
| 7,527,293 | B1 | * | 5/2009 | Wang ............................ 280/771 |
| 2003/0042157 | A1 | * | 3/2003 | Mays ......................... 206/315.1 |
| 2004/0031650 | A1 | * | 2/2004 | Taba ............................... 188/19 |
| 2004/0188164 | A1 | * | 9/2004 | Maeno et al. ................. 180/287 |
| 2005/0147466 | A1 | * | 7/2005 | Crowley, Sr. ................... 404/73 |
| 2006/0132294 | A1 | * | 6/2006 | Spark .......................... 340/426.1 |
| 2008/0074260 | A1 | * | 3/2008 | Reiner ....................... 340/568.5 |
| 2008/0124171 | A1 | * | 5/2008 | Moormeier et al. .............. 404/6 |
| 2011/0031294 | A1 | * | 2/2011 | Booth .......................... 224/576 |

* cited by examiner

TRANSPORTATION OF VALUABLES

CROSS REFERENCE TO RELATED APPLICATIONS

This application is a national stage application under 35 U.S.C. 371 and claims the benefit of PCT Application No. PCT/IB2011/055502 having an international filing date of 7 Dec. 2011, which designated the United States, and which PCT application claimed the benefit of South African Patent Application No. 2010/08800 filed 7 Dec. 2010, the disclosure of which is incorporated herein by reference.

THIS INVENTION relates to the transportation of valuables. More particularly it relates to a method of inhibiting theft of valuables being transported in a wheeled carrier. It also relates to a theft inhibiting carrier.

When transporting valuables such as cash, it is common to make use of secured, typically armoured vehicles. In order to transport the valuables between a pick-up or drop-off point and the vehicle or between other secured locations, use is often made of a manually operable wheeled carrier or trolley. The Inventors believe that the valuables are more vulnerable to theft when being transported between relatively secure locations in the wheeled carrier.

It is an object of this invention to provide means which the Inventors believe will at least ameliorate this problem.

According to one aspect of the invention there is provided a method of inhibiting theft of valuables being transported in a wheeled carrier, which includes the step of, in response to a real or perceived threat, activating theft deterrent means which includes dismounting at least one wheel or the carrier.

The wheel may be mounted on an axle and dismounting the wheel may include dismounting it from the axle. Dismounting the wheel may include explosively breaking a fastener retaining the wheel in position on the axle.

The method may include retaining the wheel connected to the rest of the carrier by an elongate tether, such that the wheel dangles loose and forms an impediment to any would-be thief.

Preferably, the method includes dismounting two wheels.

The wheeled carrier may include a wheeled carrier body and a valuables receiving container mounted on the body, activating the theft deterrent means may include feeding a settable substance into the valuables receiving container to encapsulate valuables contained in the container.

The method may include the prior step of selectively mixing a plurality of predetermined liquid chemical components, the components being adapted, when mixed, in short time to foam to expand and to set, the method accordingly including feeding the mixed components into the valuables receiving container in which they foam and set.

The method may include containing the respective liquid chemical components in separate compartments and discharging the components from the compartments in which they are contained to a mixing device prior to feeding the mixed components into the valuables receiving container.

Activating the theft deterrent means may include deploying at least one arm mounted to the carrier body from a retracted position, in which it is retained releasably in normal use, to an extended position in which it protrudes from the carrier body and increases the effective size of the carrier.

The method may include deploying two arms which, in their extended positions, protrude generally in opposite directions from the carrier body. The or each arm may be urged releasably towards its extended position, e.g. by a spring, and may be locked releasably in its extended position.

The or each arm may be provided with a plurality of relatively sharp protrusions in order to discourage gripping of the deployed arms by a would-be thief.

Activating the theft deterrent means may include triggering an alarm mounted on the carrier.

The alarm may be a visual and/or audible alarm.

Activating the theft deterrent means may include activating a smoke generator which causes smoke to be emitted from the carrier.

The method may include activating the theft deterrent means remotely. In particular the theft deterrent means may be activated in response to a signal transmitted by a transmitter and received by a receiver operatively connected to the theft deterrent means.

According to another aspect of the invention there is provided a theft inhibiting carrier which includes:

a wheeled body defining a valuables receiving chamber; and theft deterrent means which includes wheel dismounting means configured, when operated, to dismount at least one wheel of the carrier.

Each wheel may be rotatably mounted on and retained, in normal use, in position on an axle by a retaining fastener, the wheel dismounting means including an explosive charge which, when activated, disables the retaining fastener resulting in dismounting the wheel from the axle.

When dismounted from the axle the wheel may remain connected to the rest of the carrier by an elongate flexible tether.

The theft deterrent means may include at least two chemical containing containers containing liquid chemicals which, when mixed, foam, expand and set, each of the containers having an outlet which is connected in flow communication with a mixing device which, in turn, is connected in flow communication with the valuables receiving chamber and a discharge arrangement configured, when activated, to discharge the chemicals from the containers, to the mixing device and, once mixed, into the valuables receiving chamber where the mixed chemicals foam and set and encapsulate valuables contained in the chamber.

Each chemical containing container may be in the form of a cylinder, with the discharge arrangement including a piston slidably mounted in each of the cylinders and a drive arrangement drivingly connected to the pistons by connecting rods.

The drive arrangement may include a screw threaded shaft to which an electric motor is drivingly connected and a complementary screw-threaded sleeve which is threadedly engaged with the shaft and connected to the connecting rods such that rotation of the shaft causes longitudinal displacement of the sleeve and hence the piston rods and the pistons, the carrier including an electrical power source, e.g. in the form of a battery, which is connected to the electric motor.

The theft deterrent means may include at least one arm secured to the body and displaceable between a retracted position in which it is retained releasably in normal use of the carrier and an extended position in which it protrudes from the body and increases the effective size of the carrier.

The arm may be pivotally connected, at one end, to the carrier body, and may be urged, by bias means, e.g. in the form of a spring, towards its extended position, the arm being retained, in normal use, in its retracted position by a retaining element. The arm may be locked in its extended position.

The arm may include a plurality of longitudinally spaced apart sharp protrusions or spikes which serve to inhibit gripping of the arm by a would-be thief.

The theft inhibiting carrier may include two arms secured to the body and displaceable between a retracted position and an extended position.

The theft deterrent means may be remotely actuated. To this end, the carrier may include a receiver which is operatively connected to the theft deterrent means and which is configured to receive a signal from a transmitter and, upon receipt of said signal, activate the theft deterrent means.

The carrier body may include a wheeled chassis and a valuables receiving container secured to the chassis, and defining the valuables receiving chamber, the valuables receiving container being reinforced.

The valuables receiving container may include a reinforcing mesh provided between an inner and outer cover. The covers may be formed of industrial canvas and the reinforcing mesh may be in the form of a stainless steel wire mesh.

The theft inhibiting carrier may include a tracking device such as a web based GPS tracking device.

According to a further aspect of the invention there is provided a method of inhibiting theft of valuables being transported in a wheeled carrier which includes the steps of, in response to a real or perceived threat, activating theft deterrent means which includes deploying at least one arm mounted to a carrier body of the wheeled carrier from a retracted position, in which it is retained releasably in normal use, to an extended position in which it protrudes from the carrier body and increases the effective size of the carrier.

According to yet another aspect of the invention there is provided a theft inhibiting carrier which includes:

a wheeled body defining a valuables receiving chamber; and theft deterrent means which includes at least one arm secured to the body and displaceable between a retracted position in which it is retained releasably in normal use of the carrier and an extended position in which it protrudes from the body and increases the effective size of the carrier.

The invention will now be described, by way of example, with reference to the accompanying diagrammatic drawings.

Figure 1:
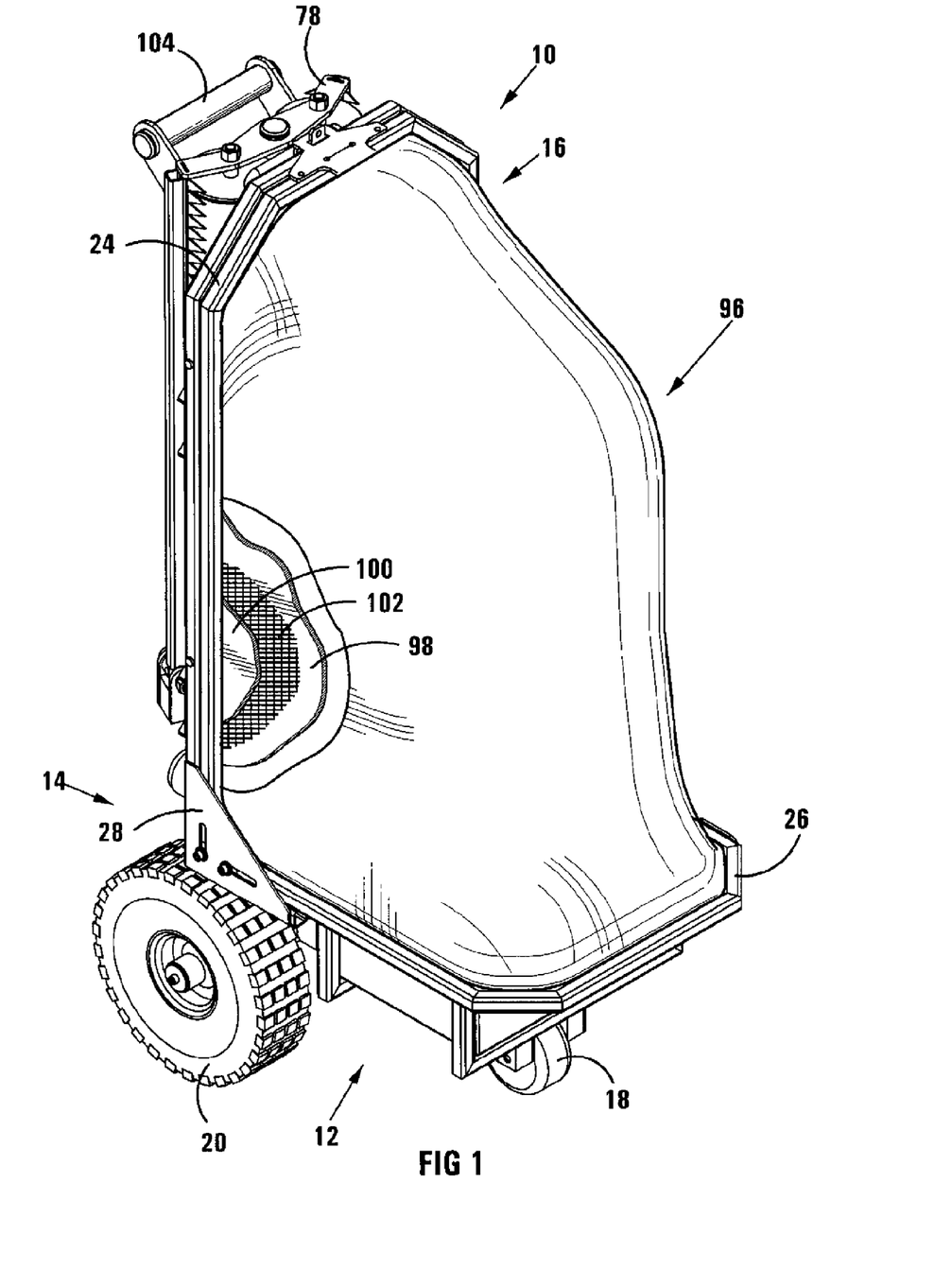
FIG. 1 shows a three-dimensional fragmentary view of a theft inhibiting carrier in accordance with the invention.

In FIG. 1 of the drawings reference numeral 10 refers generally to a theft inhibiting carrier in accordance with the invention. The carrier includes a body, generally indicated by reference numeral 12 and theft deterrent means, generally indicated by reference numeral 14.

The body 12 includes a chassis 16 on which three wheels 18, 20 and 22 are mounted as described in more detail here below.

The chassis 16 includes a main frame 24 and a base frame 26. The base frame 26 is connected to the main frame by a pair of connecting plates 28 each of which has a pair of slots 30, 32 therein with screws 34, 36 extending through the slots 30, 32 into screw threaded engagement with the main frame 24 and base frame 26, respectively. This arrangement permits the base frame 26 to be folded relative to the main frame between an operative condition (shown in solid lines in the drawings) in which the base frame 26 extends generally perpendicular to the main frame 24 and a folded or collapsed condition (shown in broken lines in FIG. 3 of the drawings) in which the base frame 26 extends generally parallel to the main frame 24.

Figure 2:
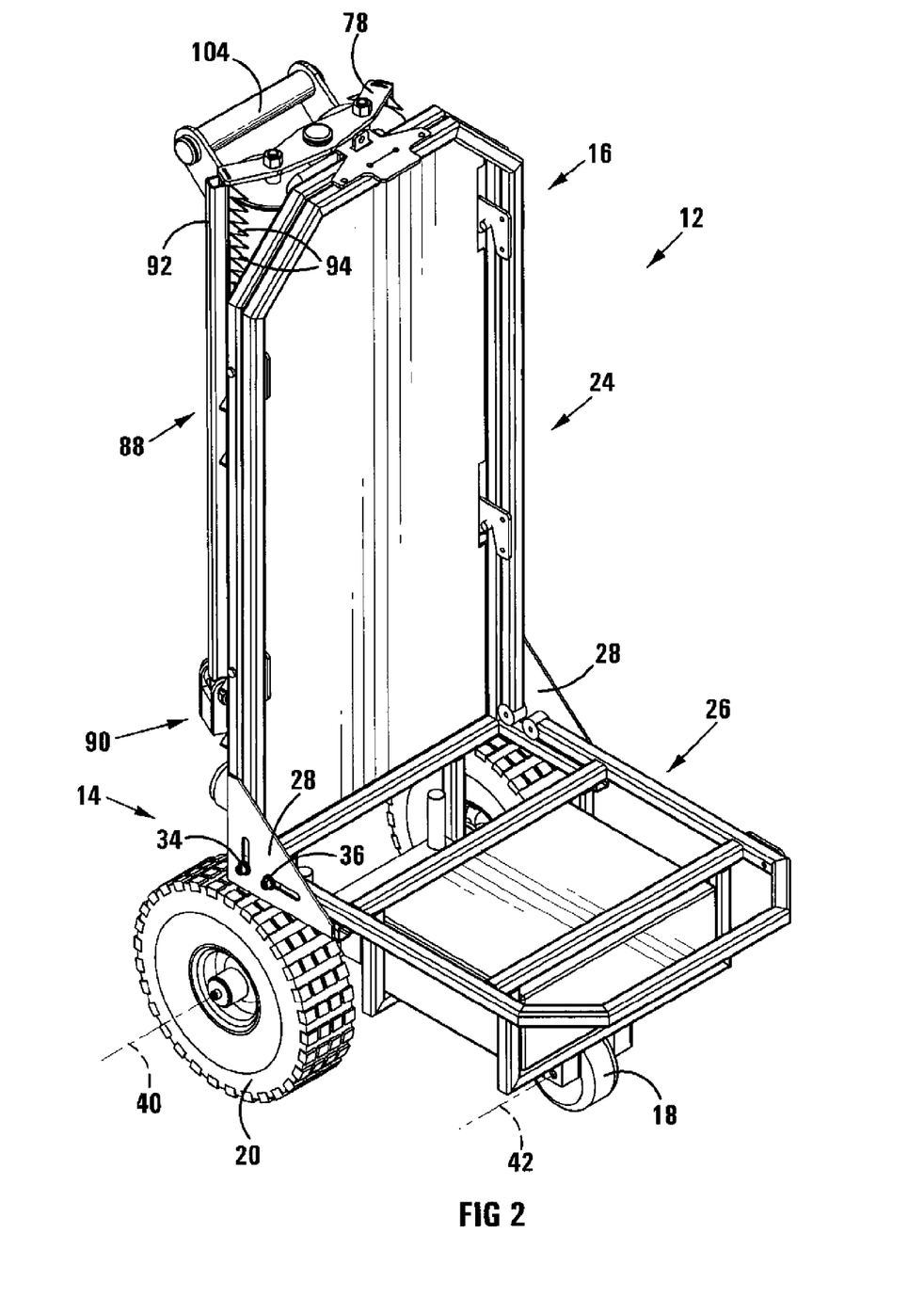
FIG. 2 shows a three-dimensional view of a chassis of the carrier of FIG. 1.
Figure 3:
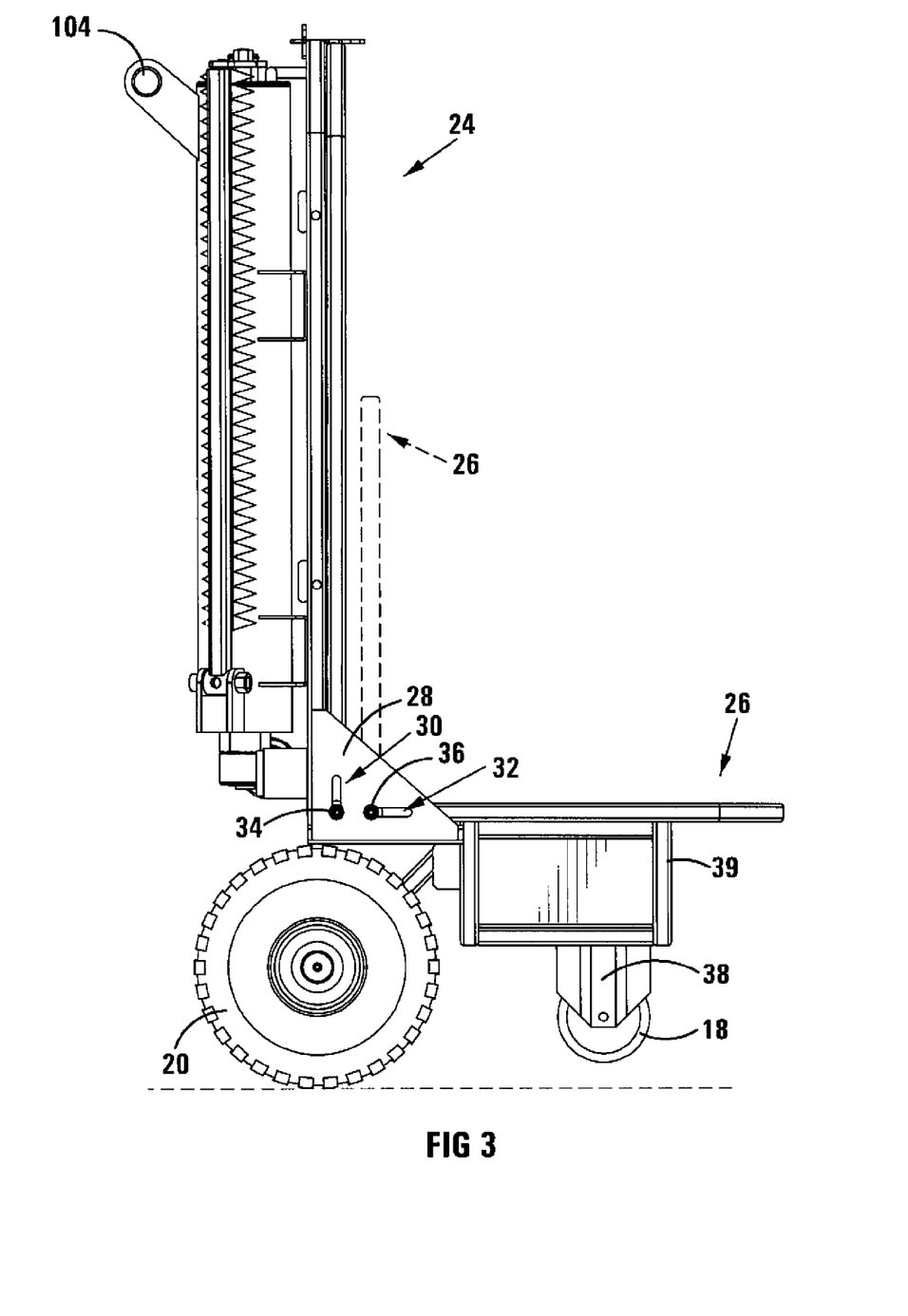
FIG. 3 shows a side view of the chassis of the carrier of FIG. 2.

The wheel 18 is mounted on a wheel support 38 which protrudes from a battery housing 39 connected to the base frame 26.

The wheels 20, 22 are substantially identical and are larger than the wheel 18. The wheels 20, 22 are connected to the base frame 26 at transversely spaced apart positions for rotation about a common axis of rotation 40 which is parallel with an axis of rotation 42 about which the wheel 18 is rotatable.

Figure 9:
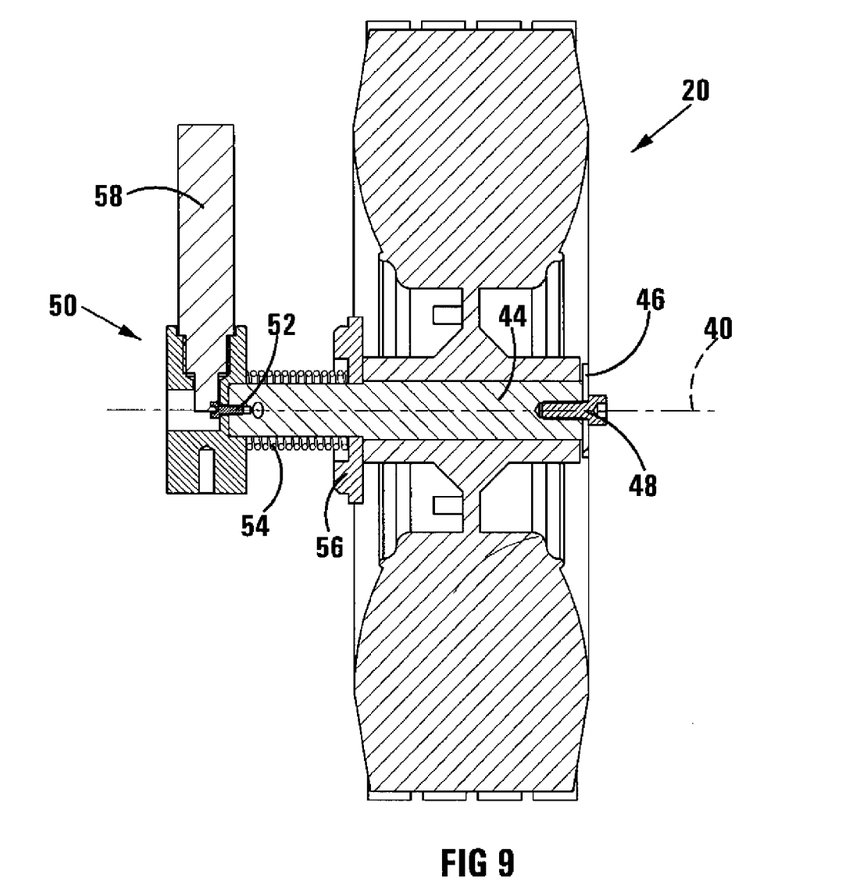
FIG. 9 shows a sectional view of the wheel assembly.

As can best be seen in FIG. 9 of the drawings, the wheel 20, which is substantially identical to the wheel 22, is mounted on an axle 44 which has a retaining washer 46 secured to one end thereof by a screw 48 and forming a shoulder which serves to limit axial displacement of the wheel 20 on the axle 44. The axle 44 protrudes from the inner side of the wheel and is secured by a shaft lock 50 to a complementary mounting formation on the base frame 26. The shaft lock 50 is secured to the protruding end of the axle by means of a locking screw 52. A coil spring 54 is mounted around the protruding portion of the axle 44 between the shaft lock 50 and a spacer 56 which abuts against the inner edge of the wheel, thereby urging the wheel away from the shaft lock 50 into abutment with the retaining washer 46.

A detonator bolt 58 is mounted on the shaft lock 50 and configured, when detonated, to break the locking screw 52 and permit the wheel 20 to be displaced, under the influence of the spring 54, away from the shaft lock 50 and dismounted from the base frame 26. An elongate flexible tether (not shown) connects the wheel 20 to the chassis 16 such that when the detonator bolt 50 is detonated, the wheel will dangle from the chassis. The tethers will each typically be about 1 m long which will impede the movement of the carrier 10 and of a would-be thief.

The theft deterrent means 14 further includes two chemical containing containers 60, 62 which are mounted on the main frame 24.

Figure 7:
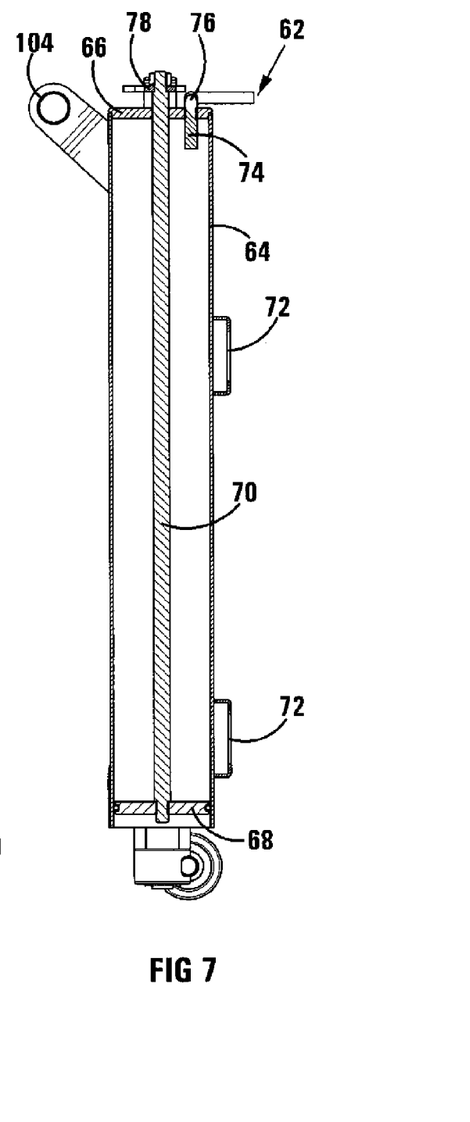
FIG. 7 shows a sectional view taken at VII-VII in FIG. 6.
Figure 8:
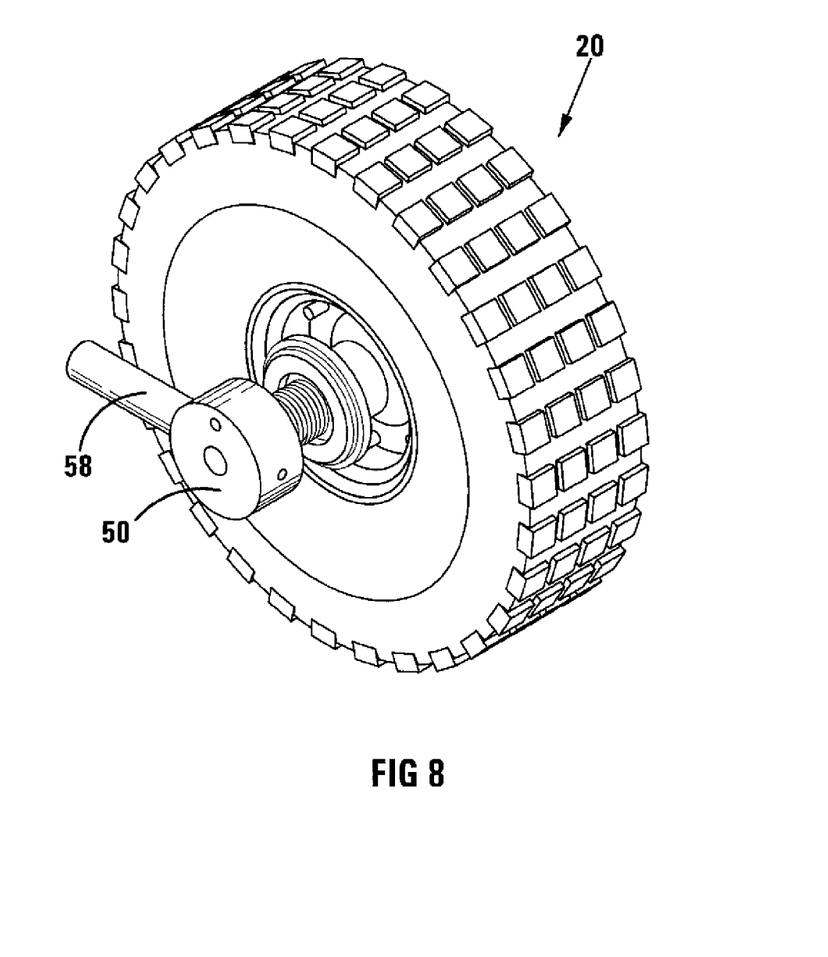
FIG. 8 shows a three-dimensional view of a wheel of the carrier.

As can best be seen in FIG. 7 of the drawings, each container 60, 62 includes a cylinder 64 having a top 66. A piston 68 is sealingly mounted for reciprocation within the cylinder 64 and a connecting rod 70, a lower end of which is connected to the piston, extends axially upwardly through the cylinder 64 and through a hole in the top 66. The cylinders 64 are connected together by a pair of brackets 72 which ensures that the axes of the cylinders 64 remain parallel. The brackets 72 are connected to the main frame 24.

An outlet 74 leads from each cylinder through the top 64 and is connected, via a mixing device 76 to a feed pipe to the interior of a valuables receiving chamber defined by the body 12.

A bridge piece 78 is secured to the protruding ends of the connecting rods 70.

Figure 6:
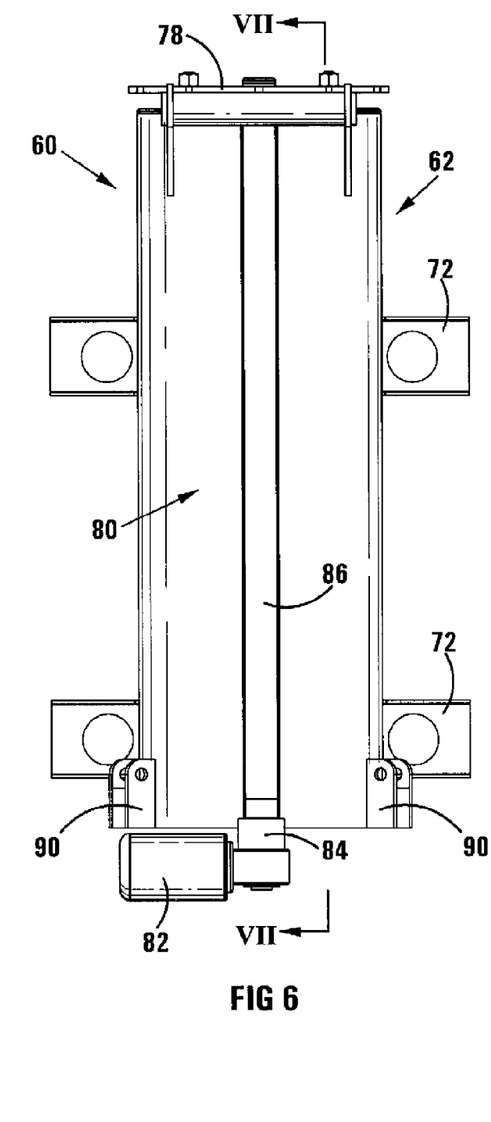
FIG. 6 shows, on an enlarged scale, part of the theft deterrent means of the carrier of FIG. 1.

The carrier 10 includes a drive arrangement, generally indicated by reference numeral 80 which comprises an electric motor 82 which is connected to a battery (not shown) contained in the housing 39. The electric motor 82 is drivingly connected to a vertically extending screw threaded shaft 84. A complementary screw threaded sleeve 86 is threadedly engaged with the shaft 84 with an upper end of the sleeve 86 being connected to the bridge piece 78 such that operation of the motor causes rotation of the shaft and hence axial displacement of the sleeve 86. This in turn causes simultaneous upward displacement of the connecting rods 70 and pistons 68 in order to discharge the contents of the containers 60, 62 through the outlets, to the mixing device 76 from where the mixed components are discharged into the valuables receiving cavity.

The containers contain liquid chemicals which, when mixed, foam and set relatively rapidly.

The theft deterrent means 14 further includes a pair of arms 88, one of which is connected to each of the containers 60, 62 by brackets 90. Each arm is pivotally connected at its operatively lower end to the associated container and comprises a rod 92 to which angularly spaced sets of longitudinally spaced apart sharpened teeth 94 are attached. The teeth 94 are angularly spaced apart such that, when the rod 92 is in its retracted position, they abut against the outer side of the cylinder 64 of the associated container 60, 62 such that they are harmless. The arms 88 are retained releasably in their retracted positions by a retaining element in the form of the bridge piece 78.

The arms 88 are urged by springs towards extended positions (shown in broken lines) in which they protrude laterally from the containers 60, 62 and the teeth 94 are exposed. The arms are retained releasably in their extended positions.

The body 12 includes a valuables receiving container 96 mounted on the chassis 16.

The valuables receiving container includes inner and outer layers 98, 100 of a flexible material such as industrial canvas and an intermediate reinforcing layer, e.g. of a metallic mesh, 102 positioned between the layers 98, 100.

In use, the carrier 10 is used to transport valuables contained within the valuables receiving chamber, typically between an armoured vehicle and a pick-up or drop-off point. The security guard wheeling the trailer between the locations makes use of a handle 104 which is attached to the containers 60, 62.

In response to a real or perceived threat, the security guard activates the theft deterrent means. This can be done by means of an actuator mounted on the body 12 or alternatively by a remote arrangement making use of a complementary transmitter and receiver mounted on the body 12. In yet another embodiment the receiver may sense the presence of the transmitter and may actuate the theft deterrent means if the transmitter is outside a predetermined range for more than a predetermined amount of time.

In response to the actuation of the theft deterrent means, the detonator bolts 58 are detonated thereby breaking the locking screws 52. The wheels 20, 22 are urged outwardly in opposite directions such that they separate from the chassis 16. However, as mentioned above, the wheels remain connected to the chassis by an elongate flexible tether such that they dangle loose and form an impediment to any would-be thief in transporting the carrier 10.

Figure 4:
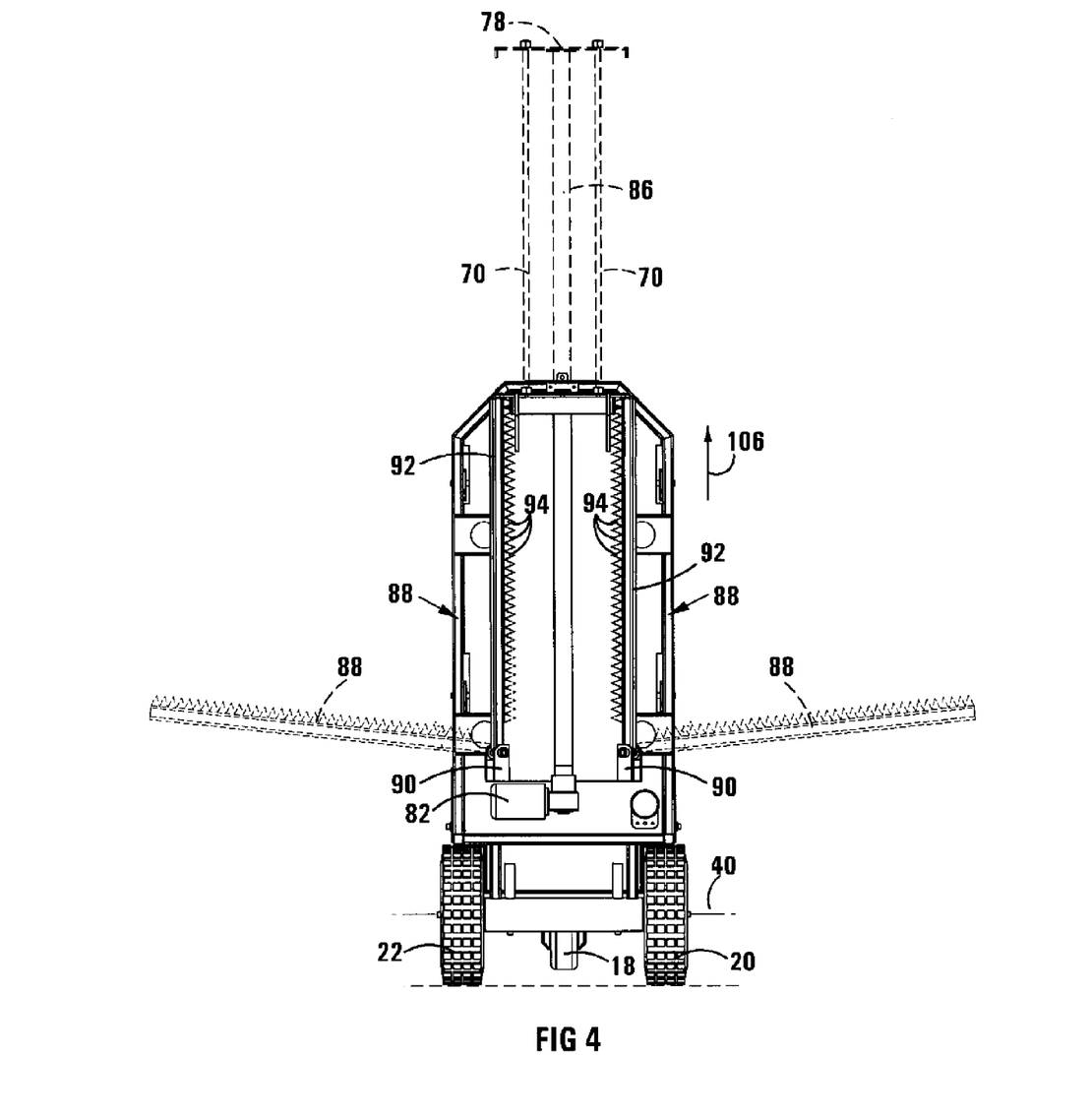
FIG. 4 shows a rear view of the chassis of FIGS. 2 and 3.
Figure 5:
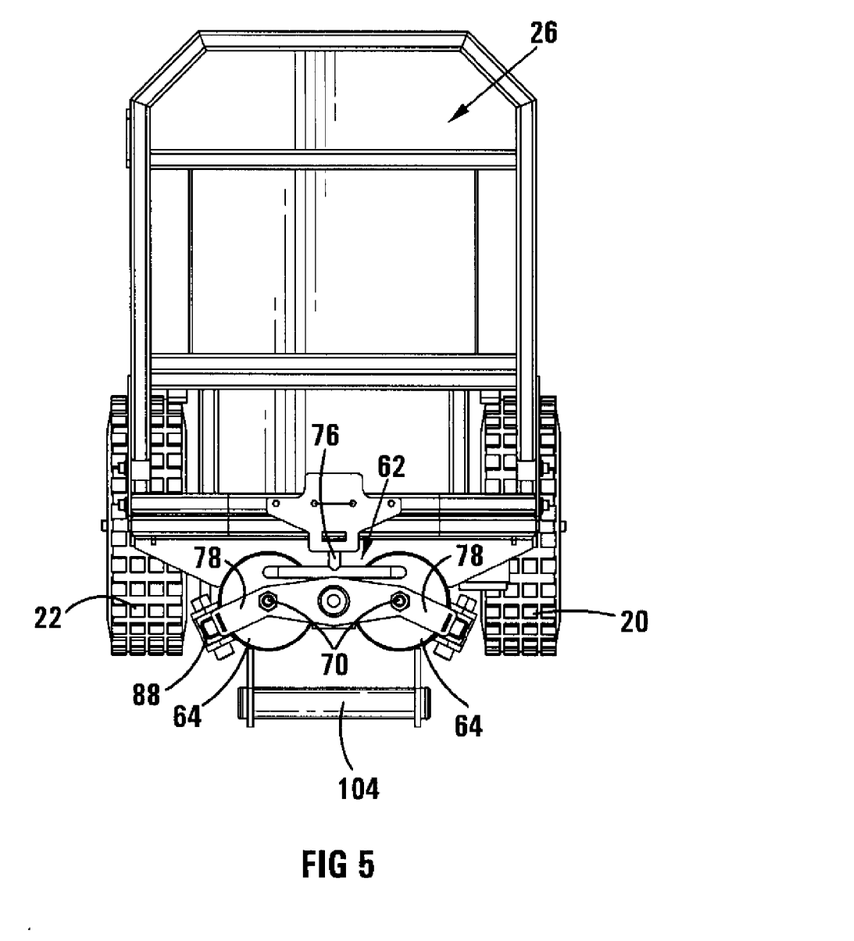
FIG. 5 shows a plan view of the chassis of FIG. 2.

In addition, the electric motor 82 is energised which serves to rotate the shaft 84 and cause the sleeve 86 to be displaced longitudinally upwardly in the direction of arrow 106 (FIG. 4). This in turn causes the pistons 68 to move upwardly in the cylinders 64 thereby discharging the liquid chemicals through the outlets 74 to the mixing device 76. The mixed chemicals are then discharged into the valuables receiving cavity where they foam and set and encapsulate the valuables contained within the chamber making access to the valuables extremely difficult.

It will be appreciated that as the sleeve 86 is displaced upwardly, the bridge piece 78 and connecting rods move upwardly thereby effectively increasing the height of the carrier 10 making it more difficult to manoeuvre through tight spaces and load into vehicles.

In addition, as the bridge piece 78 moves upwardly, the arms 88 are released and displaced, under the influence of springs to their extended positions in which they are locked by means of locking pins. In their extended positions, the arms protrude laterally with the teeth protruding therefrom. This has the dual function of increasing the lateral dimensions of the carrier 10 making it extremely difficult to manoeuvre through restricted spaces such as doors and the like. In addition, the sharp teeth on the arms make it very difficult to grip the arms and manoeuvre the carrier 10.

If desired, the carrier 10 may incorporate a visual and/or audible alarm. The visual alarm may include a smoke generator which is activated when the theft deterrent means is activated. The audible alarm may include a siren, typically a 115 db siren.

The Inventors believe that a carrier 10 in accordance with the invention will, once the theft deterrent means 14 has been activated, be relatively difficult to transport. In addition, with the alarm activated and the wheels dangling any would-be thief attempting to transport the carrier 10 will draw attention to himself thereby greatly increasing his chances of apprehension. As a result, the Inventors believe that a carrier in accordance with the invention will serve as a theft deterrent.

The invention claimed is:

1. A method of inhibiting theft of valuables being transported in a wheeled carrier, comprising:
   activating, by a remote activation signal, theft deterrent means of the carrier which includes dismounting at least one wheel or from an axle of the carrier by explosively breaking a fastener retaining the at least one wheel in position on the axle;
   further providing the carrier with:
   a wheeled carrier body and a valuables receiving container mounted on the wheeled carrier body;
   wherein activating the deterrent means includes:
   selectively mixing a plurality of predetermined liquid chemical components and accordingly feeding the mixed components into the valuables receiving container to cause the plurality of predetermined liquid chemical components to foam, expand and set within a short time to encapsulate valuables contained within the valuables receiving container; and
   deploying at least one arm of the deterrent means provided with a plurality of relatively sharp protrusions from a retracted position to an extended position to protrude from the wheeled carrier body and increase the effective size of the wheeled carrier, in order to discourage gripping of the deployed at least one arm by a would-be thief.

2. A method as claimed in claim 1, which includes retaining the dismounted wheel connected to the rest of the carrier by an elongate tether, such that the wheel dangles loose and forms an impediment to any would-be thief.

3. A method as claimed in claim 1, which includes dismounting two wheels of the carrier.

4. A method as claimed in claim 1, which includes containing the plurality of predetermined liquid chemical components in a respective separate compartment and discharging the components from the compartment in which they are contained to a mixing device prior to feeding the mixed components into the valuables receiving container.

5. A method as claimed in claim 1, wherein the at least one arm includes two arms, and activating the deterrent means includes deploying the two arms which, in their extended position, protrude in opposite direction from the carrier body.

6. A method as claimed in claim 1, in which activating the theft deterrent means includes triggering an alarm mounted on the carrier, the alarm being a visual and/or audible alarm.

7. A method as claimed in claim 1, in which activating the theft deterrent means includes activating a smoke generator which causes smoke to be emitted from the carrier.

8. A theft inhibiting wheeled carrier comprising:
a wheeled carrier body defining a valuables receiving chamber;
a theft deterrent means activated by reception of a remote activation signal;
wherein the theft deterrent means includes:
wheel dismounting means configured, when operated, to dismount at least one wheel of the carrier, the wheel dismounting means including an explosive charge which, when activated, dismounts the at least one wheel; and
at least one arm secured to the body and when activated, being displaced between a retracted position in which the at least one arm is retained releasably in normal use of the carrier and an extended position to protrude from the body to increase an effective size of the carrier, the at least one arm being pivotally connected at one end to the carrier body, and being urged by bias means towards its extended position, the at least one arm including a plurality of longitudinally spaced apart sharp protrusions or spikes which serves to inhibit gripping of the arm by a would-be thief.

9. A theft inhibiting carrier as claimed in claim 8, which includes an elongate flexible tether whereby the wheel, when dismounted from the axle, remains connected to the rest of the carrier.

10. A theft inhibiting carrier as claimed in claim 8, in which the theft deterrent means includes at least two chemical containing containers containing liquid chemicals which, when mixed, foam, expand and set, each of the containers having an outlet which is connected in flow communication with a mixing device which, in turn, is connected in flow communication with the valuables receiving chamber and a discharge arrangement configured, when activated, to discharge the chemicals from the containers, to the mixing device and, once mixed, into the valuables receiving chamber where the mixed chemicals foam and set and encapsulate valuables contained in the chamber.

11. A theft inhibiting carrier as claimed in claim 10, in which each chemical containing container is in the form of a cylinder, with the discharge arrangement including a piston slidably mounted in each of the cylinders and a drive arrangement drivingly connected to the pistons by connecting rods, the drive arrangement including a screw threaded shaft to which an electric motor is drivingly connected and a complementary screw-threaded sleeve which is threadedly engaged with the shaft and connected to the connecting rods such that rotation of the shaft causes longitudinal displacement of the sleeve and hence the piston rods and the pistons, the carrier including an electrical power source which is connected to the electric motor.

12. A theft inhibiting carrier as claimed in claim 8, wherein the at least one arm includes two arms that are secured to the body and displaceable between a retracted position and an extended position.

13. A theft inhibiting carrier as claimed in claim 8, in which the theft inhibiting carrier includes a receiver which is operatively connected to the theft deterrent means and which is configured to receive the remote activation signal from a transmitter and, upon receipt of said signal, activate the theft deterrent means.

14. A theft inhibiting carrier as claimed in claim 8, in which the carrier body includes a wheeled chassis and a valuables receiving container secured to the chassis, and defining the valuables receiving chamber, the valuables receiving container being reinforced.

15. A theft inhibiting carrier as claimed in claim 8, which includes a tracking device.

16. A method of inhibiting theft of valuables being transported in a wheeled carrier comprising:
activating, by a remote activation signal, theft deterrent means of the carrier which includes dismounting at least one wheel from an axle of the carrier by explosively breaking a fastener retaining the at least one wheel in position on the axle; and
deploying at least one arm mounted to a carrier body of the wheeled carrier from a retracted position, in which it is retained releasably in normal use, to an extended position to protrude from the carrier body and to increase an effective size of the wheeled carrier, the at least one arm having a plurality of sharp protrusions to discourage gripping of the deployed at least one arm by a would-be thief.

* * * * *